J. G. SCHREUDER & V. K. SPICER.
APPARATUS FOR AUTOMATICALLY CONTROLLING THE SPEED OF TRAINS.
APPLICATION FILED AUG. 3, 1907.

903,410.

Patented Nov. 10, 1908.
6 SHEETS—SHEET 1.

WITNESSES
R. A. Balderson
W. W. Swartz

INVENTORS
J. G. Schreuder
V. K. Spicer
by Bakewell, Byrnes & Parmelee,
their Attys.

J. G. SCHREUDER & V. K. SPICER.
APPARATUS FOR AUTOMATICALLY CONTROLLING THE SPEED OF TRAINS.
APPLICATION FILED AUG. 3, 1907.
903,410.
Patented Nov. 10, 1908.
6 SHEETS—SHEET 2.
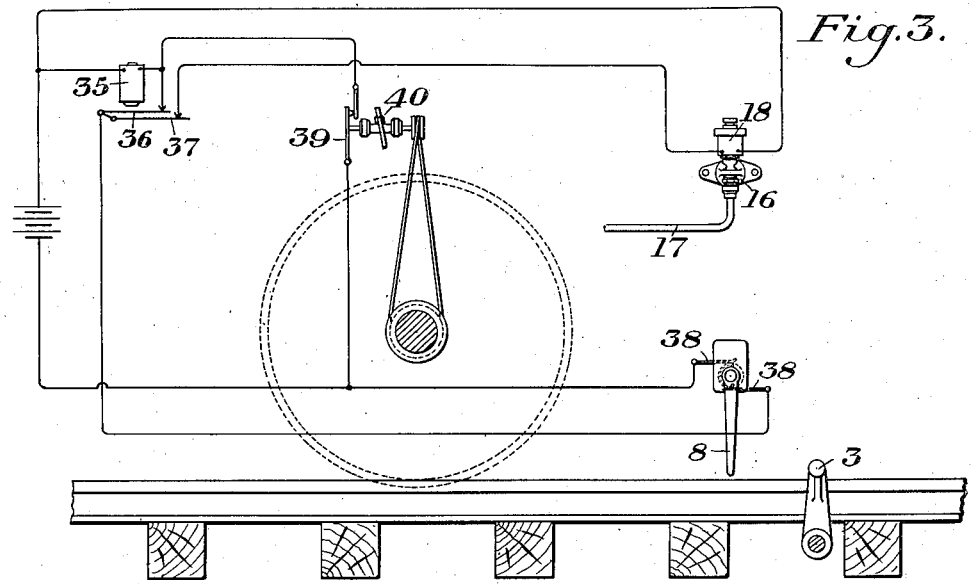
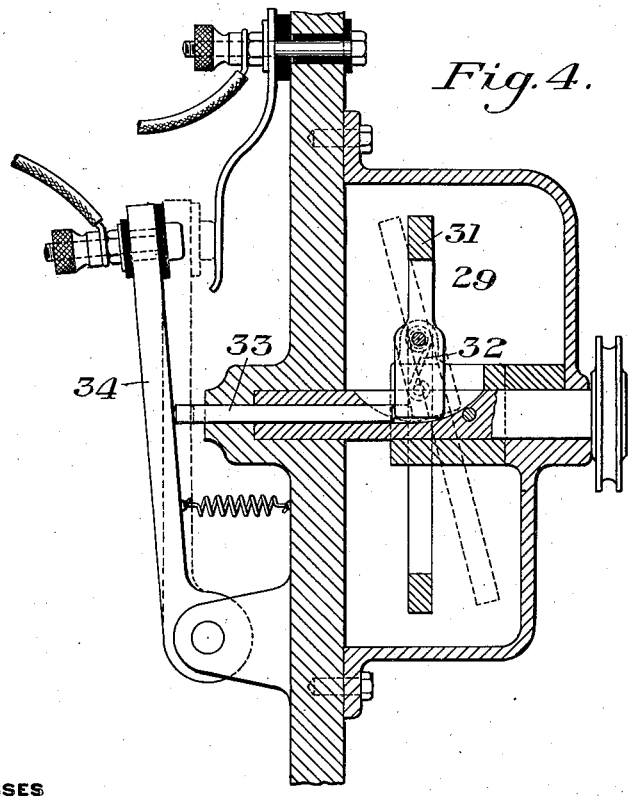

J. G. SCHREUDER & V. K. SPICER.
APPARATUS FOR AUTOMATICALLY CONTROLLING THE SPEED OF TRAINS.
APPLICATION FILED AUG. 3, 1907.
903,410.
Patented Nov. 10, 1908.
6 SHEETS—SHEET 3.
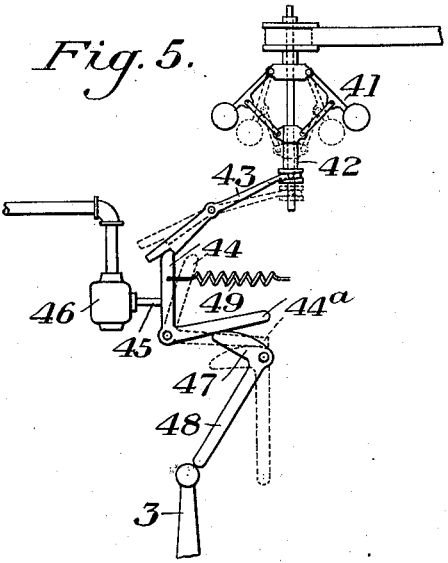
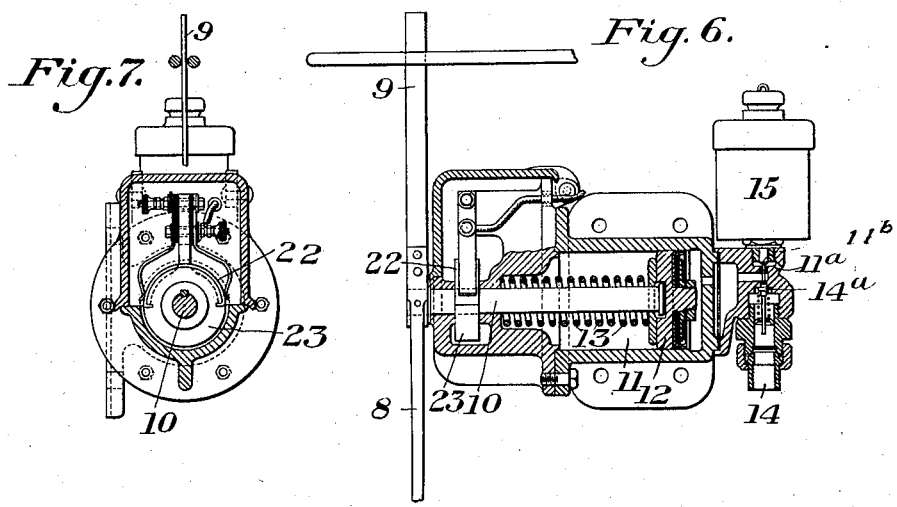
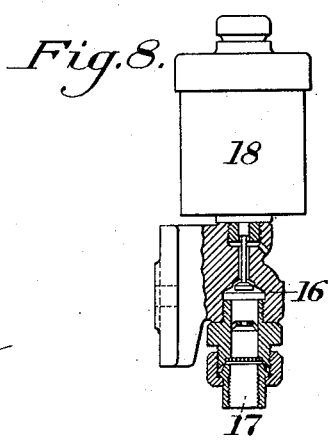
WITNESSES
R. A. Balderson
W. W. Swartz
INVENTORS
J. G. Schreuder
V. K. Spicer
by Bakewell, Byrnes & Parmelee
their Attys.

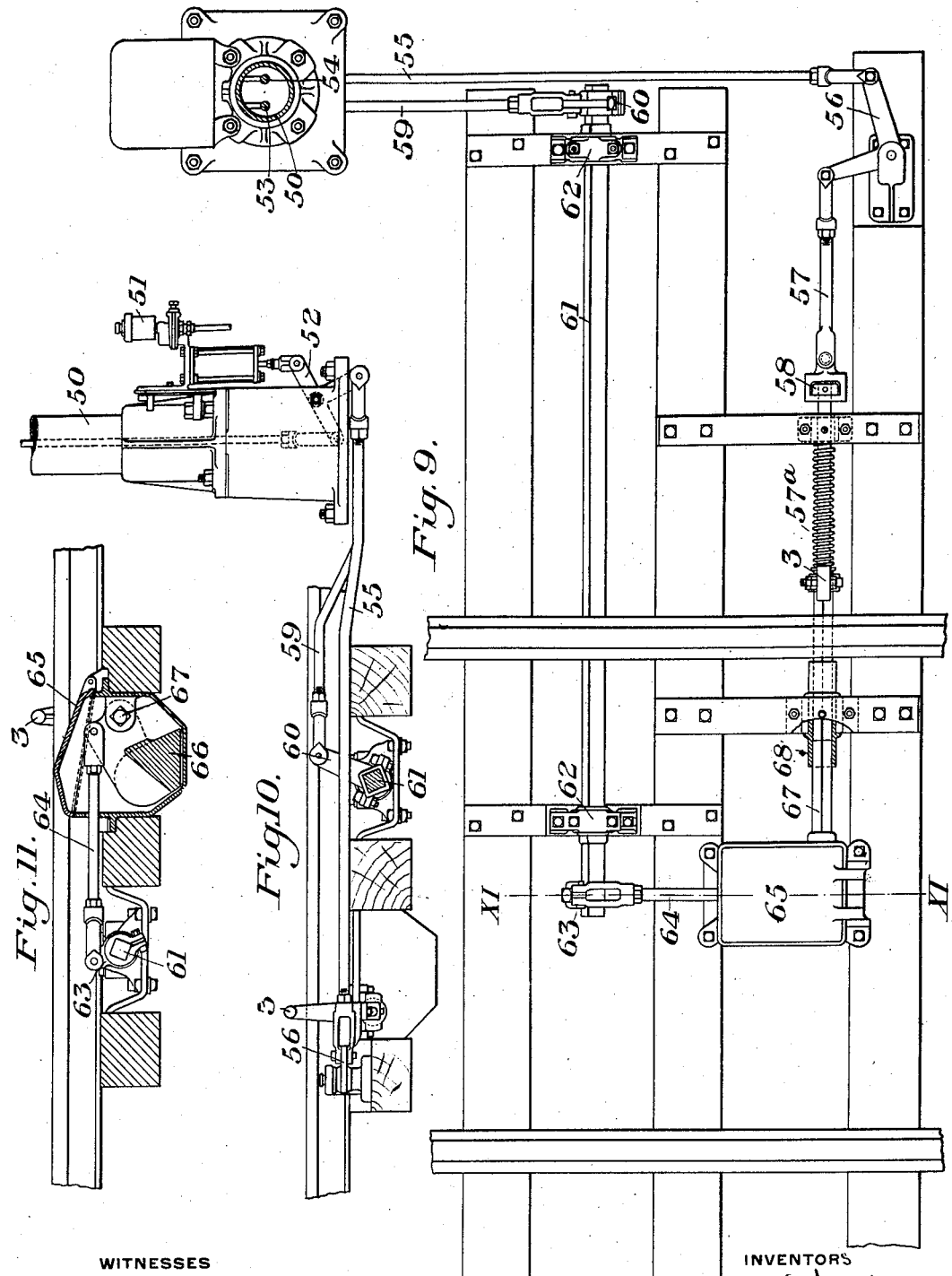

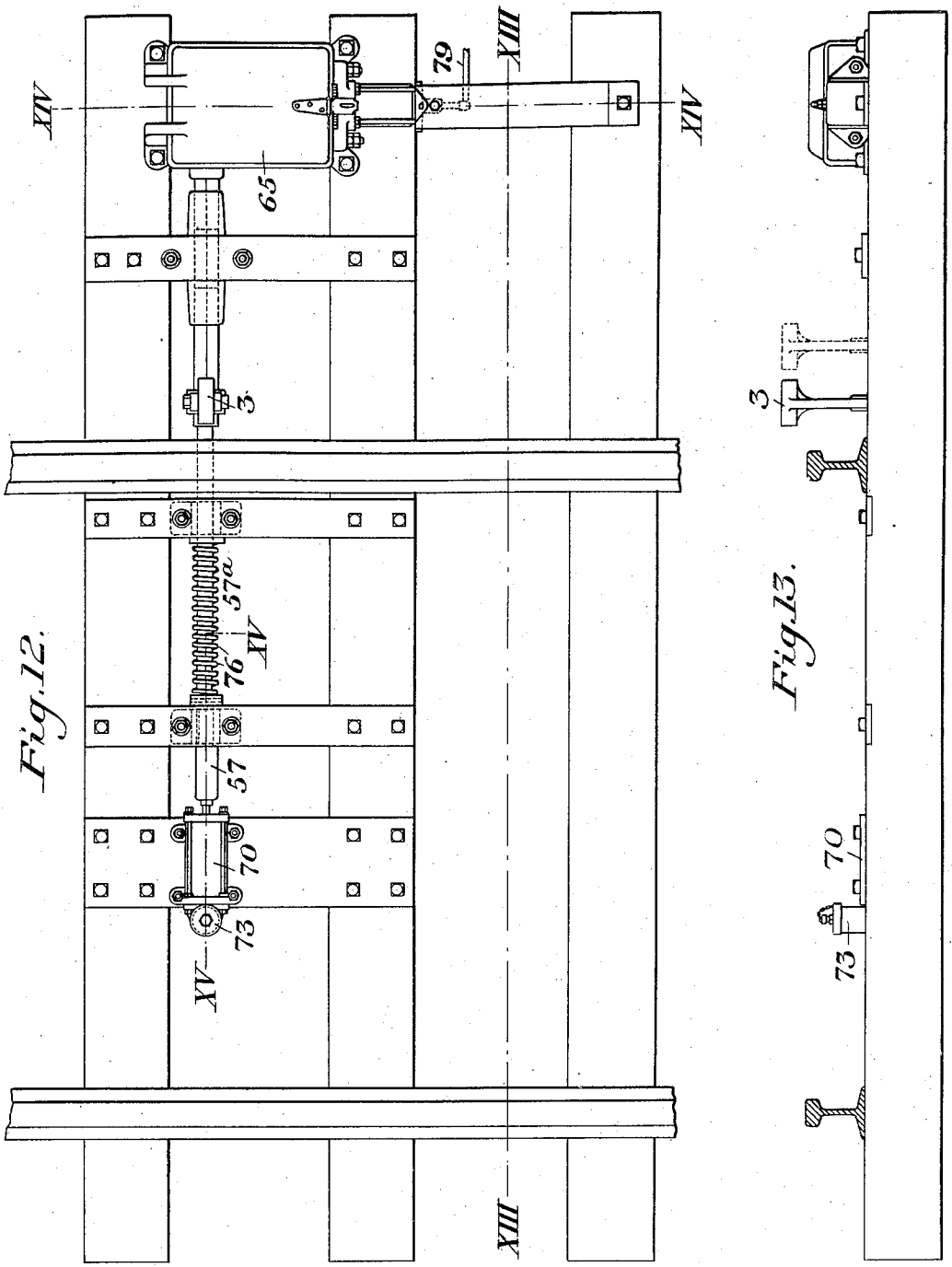

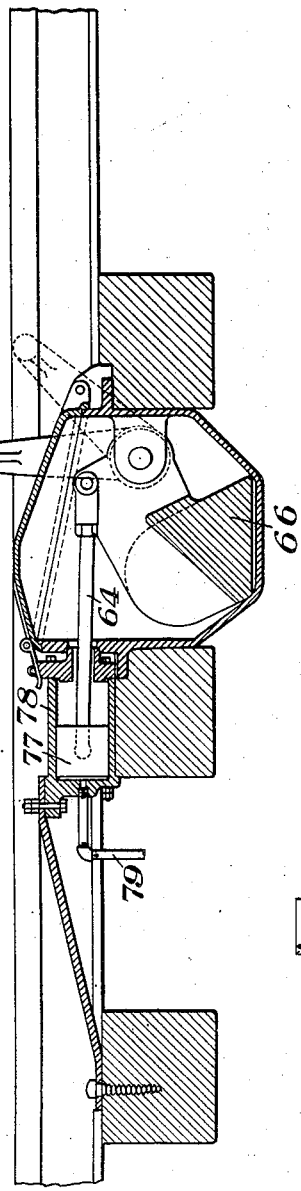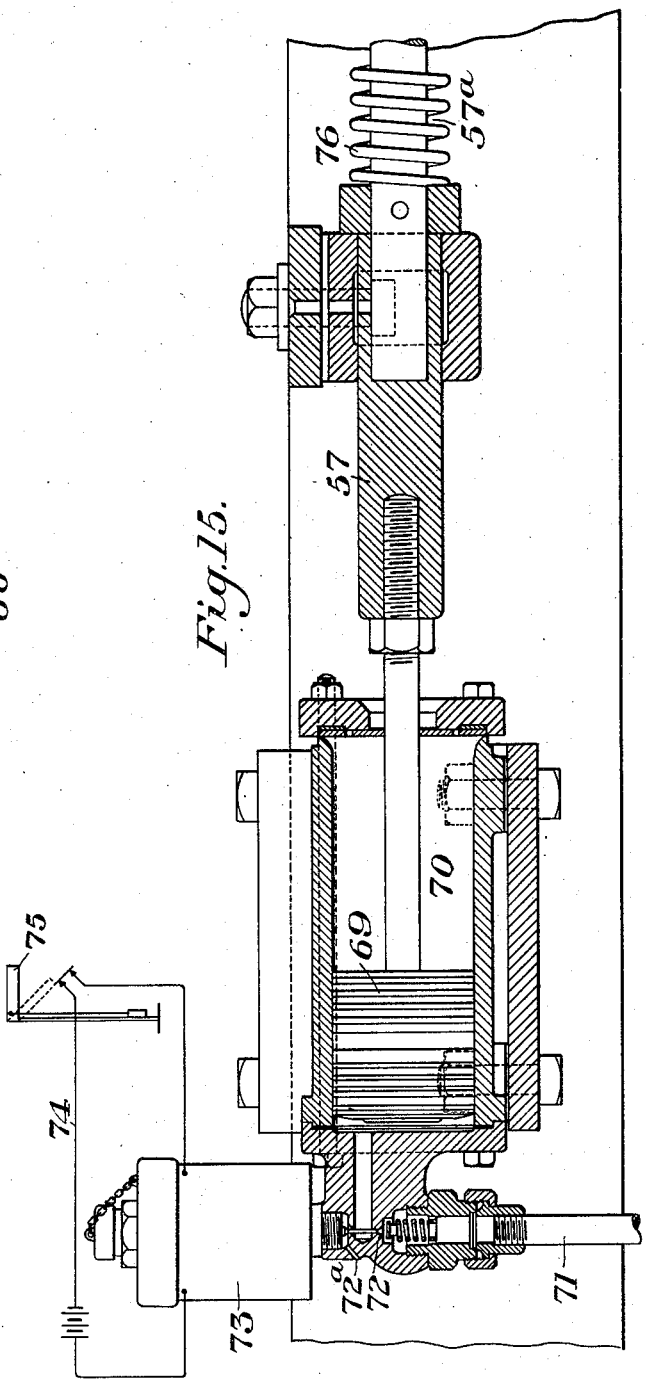

UNITED STATES PATENT OFFICE.

JENS G. SCHREUDER, OF EDGEWOOD PARK, PENNSYLVANIA, AND VIBE K. SPICER, OF CHICAGO, ILLINOIS, ASSIGNORS TO THE UNION SWITCH & SIGNAL COMPANY, OF SWISSVALE, PENNSYLVANIA, A CORPORATION OF PENNSYLVANIA.

APPARATUS FOR AUTOMATICALLY CONTROLLING THE SPEED OF TRAINS.

No. 903,410.  Specification of Letters Patent.  Patented Nov. 10, 1908.

Application filed August 3, 1907. Serial No. 386,932.

*To all whom it may concern:*

Be it known that we, JENS G. SCHREUDER, of Edgewood Park, Allegheny county, Pennsylvania, and VIBE K. SPICER, of Chicago, Cook county, Illinois, have invented a new and useful Apparatus for Automatically Controlling the Speed of Trains, of which the following is a full, clear, and exact description, reference being had to the accompanying drawings, forming part of this specification, in which—

Figure 1:
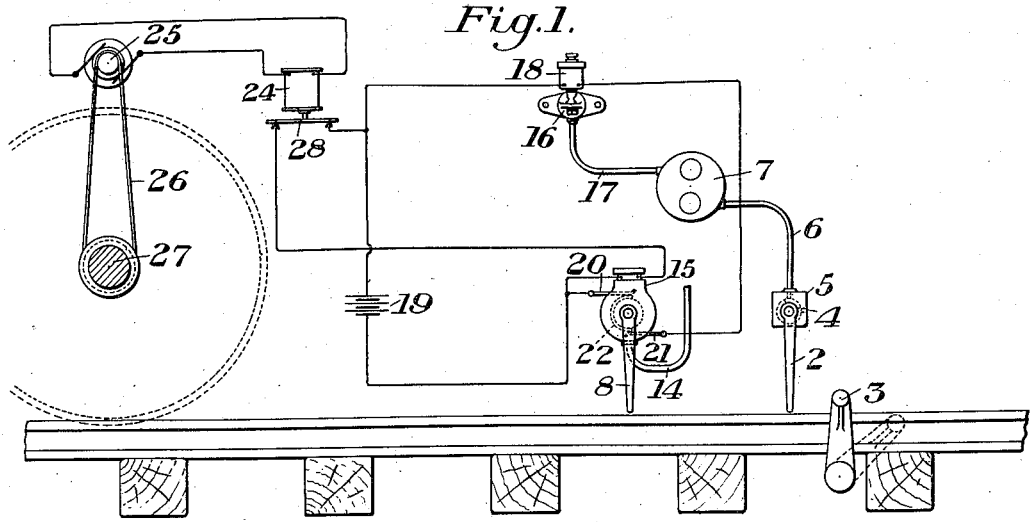
Figure 2:
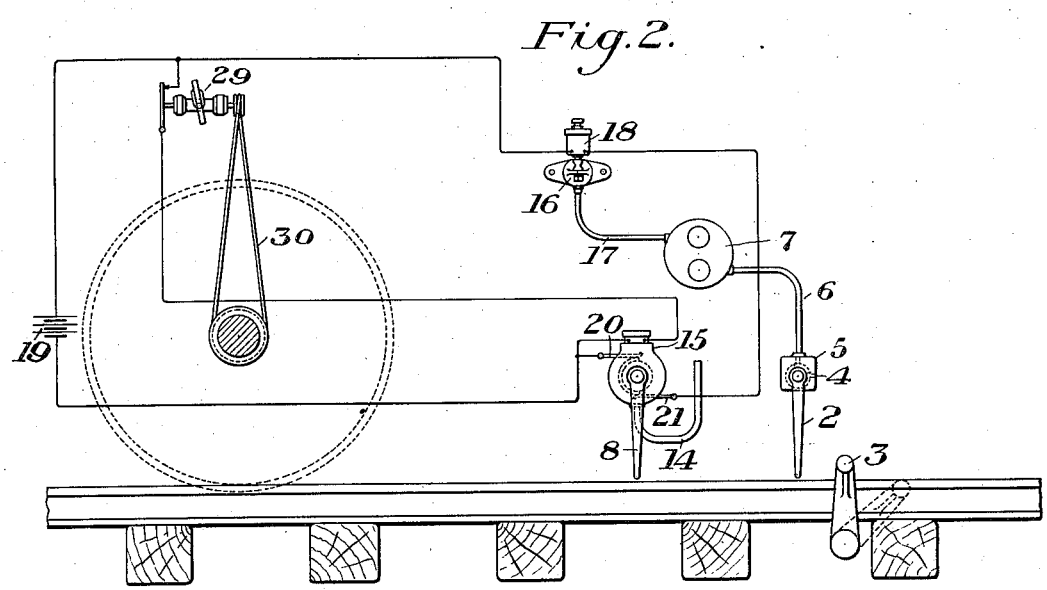

Figures 1, 2 and 3 are diagrammatic views illustrating different embodiments of our invention; Fig. 4 is a detail sectional view of one form of speed control switch; Fig. 5 is a diagrammatic view showing another method of controlling the operation of the valve which effects the service application of the brakes; Figs. 6 and 7 are detail sectional views of valve mechanism and shifting motor for changing the position of the trip arm employed, hereinafter more fully refered to; Fig. 8 is a sectional view of the valves; Fig. 9 is a plan view partly in section showing the manner in which the track trips are connected with the home and distant signal mechanism; Fig. 10 is a sectional side elevation of the same, partly broken away; Fig. 11 is a section on the line XI—XI of Fig. 9; Fig. 12 is a plan view showing modified means for actuating the track trips; Fig. 13 is a section on the line XIII—XIII of Fig. 12; Fig. 14 is an enlarged section on the line XIV—XIV of Fig. 12; and Fig. 15 is an enlarged section on the line XV—XV of Fig. 12, and also showing diagrammatically the circuit of the valve controlling magnet.

Our invention has relation to the automatic control of engines and trains, and is designed to provide means whereby a train may be either automatically brought to a full stop, or its speed reduced to any desired limit, at any point or points upon the road.

To this end, our invention includes trip-actuated means carried by the train, (and by the term "train" as used herein, we desire to include all kinds of railway motors and vehicles either single or attached) arranged when operated to actuate a brake valve to set the brakes and stop the train. It also includes in connection with such means, or emergency stop, a second trip-actuated device which is arranged to effect a predetermined reduction in the brake pipe pressure, and thereby cause a service application of the brakes to reduce the speed to any desired limit. This last named means is particularly desirable in passing a distant signal set at the caution position, or at curves or other points where it is desirable for safety that the speed shall not exceed a predetermined maximum. Inasmuch as this last named mechanism is not required to operate unless the speed of the train at the time exceeds the predetermined maximum, we further provide means whereby such mechanism remains inoperative below a certain speed. We also preferably use in connection with our invention, but forming no part thereof, valve mechanism for effecting the service application of the brakes, of a character which will prevent any manual interference by the engineer during the period of such application, and which will automatically restore the brake pipe presssure after a predetermined interval. Valve mechanism of this character is manufactured by the Westinghouse Air Brake Company, and a form thereof is described and claimed in the application of Walter V. Turner, Serial No. 373,243, filed May 23, 1907.

The track trips for actuating the mechanism carried by the train may be arranged to be operated by or in connection with the track signal mechanism, so as to be moved into and out of operative position, as the signals are moved from one position to another. In such cases, a single track trip arm is preferably connected with both the home and distant signal mechanism in such a manner that it will be moved into position for contact with the emergency stop mechanism on the train when the home signal is at danger position, and into position for contact with the service application mechanism, when the distant signal is at cautionary position. When both signals are at safety position, said trip arm is preferably thrown entirely out of operative position. Track trips suitable for operating either the service or emergency mechanism may be used independently of the signals, being secured to the track or permanent way either temporarily or permanently at any desired point.

Referring to the accompanying drawings, the numeral 2 designates a depending pivoted trip arm which is preferably secured to the frame of the engine, and which is designed to be engaged and operated by a track trip arm 3. The arm 2 when moved by engagement with the arm 3 is arranged to open an exhaust port 4 of a valve 5 which is connected with a fluid pipe 6. This fluid pipe may be the regular train brake pipe, or it may be connected to the train brake pipe through valve mechanism indicated diagrammatically at 7. This valve mechanism is preferably of the character described and claimed in the application of Walter V. Turner, above referred to, and it is arranged to operate to set the brakes as by the escape of fluid from the pipe 6. The valve 5 may, however, be any well known form of valve which will directly cause the application of the brakes by exhausting fluid from the pipe 6.

8 designates a second depending trip arm which is normally held in central position by a suitable spring 9, (Figs. 6 and 7), and which is also designed for engagement with the trip arm 3 under certain conditions. This arm is attached to a pivotally mounted shaft 10 which extends into a fluid cylinder 11 and carries a piston 12. The shaft, piston, and the arm 8 are normally held in the inoperative position shown in Fig. 6 by means of the spring 13 within the cylinder 11. Connected with the cylinder 11 is a fluid supply pipe 14. The connection between this pipe and the cylinder is controlled by a valve 14$^a$ whose stem is arranged to be actuated by an electromagnet 15.

16 is an escape valve, (shown in detail in Fig. 8) which is also arranged to exhaust air from a pipe 17 which may be connected directly to the train brake pipe, in which case the valve 16 may be any well known form of valve adapted to effect a predetermined degree of reduction in the brake pipe pressure. We prefer, however, to connect the pipe 17 to the valve mechanism 7 above referred to, and which operates by the reduction of pressure in said pipe to effect a service application of the brakes for a predetermined period. This valve is normally held closed by an electromagnet 18 which is included in an electric circuit supplied by a battery 19. One branch of this circuit extends through the contact fingers 20 and 21 which normally engage a contact 22 on the shaft or spindle 10 which carries the trip arm 8. This contact band 22 extends around substantially one-half the circumference of the hub 23, and is normally engaged by both fingers 20 and 21. A slight movement of the arm 8 in either direction will, however, cause the disengagement of one of the fingers with this contact band, and thus open the circuit of the magnet 18. The circuit of the magnet 15 is controlled by an electromagnet 24 whose winding is included in the circuit of a generator 25 which is driven by belt or other connection 26 with one of the axles, or other apparatus 27 of the engine or vehicle. The circuit of the magnet 15 is normally held closed by the armature 28 of the magnet 24. When, however, the speed of the train exceeds a certain predetermined maximum, sufficient current will be developed by the generator 25 through the coils of the magnet 24 to raise the armature 28, and thereby open the circuit of the magnet 15. To this end, the circuit in which the winding of the magnet 24 is included may contain any suitable voltage and current regulating device, or either, so that said magnet may be made effective at any desired speed.

When the circuit of the magnet 15 is opened, the stem of the valve 14$^a$ drops and opens the connection between the fluid supply pipe 14 and the interior of the cylinder 11, thereby admitting pressure behind the piston 12 and moving said piston together with the arm 8 outwardly into position to be engaged by the track trip 3. This engagement may move the arm 8 to break the circuit of the magnet 18, thereby opening the valve 16 to exhaust fluid from the pipe 17 to effect a service application of the brakes.

It will be apparent from the foregoing description that the operative position of the trip arm 8 is controlled entirely by the speed of the train. So long as the speed remains below the predetermined maximum, the circuit of the magnet 15 remains closed and the trip arm 8 is held in inoperative position. As soon, however, as the speed exceeds this predetermined maximum, the energization of the magnet 24 opens the circuit and allows fluid to enter the cylinder 11 to move the arm 8 to operative position.

The arrangement shown in Fig. 2 is similar to that shown in Fig. 1, except that instead of an electric speed controlling device, a centrifugally acting speed governor 29 is employed, driven by a belt 30 or other suitable connection with one of the axles, or other apparatus of the engine or vehicle. This device may be any well known form of centrifugal governor, such as that shown in detail in Fig. 4, in which 31 designates an eccentrically pivoted weight member which is normally held in the oblique position indicated by the dotted lines by a spring 32, but which tends to approach the vertical position shown by the full lines as its speed increases. This centrifugally acting member operates through a movable stem or plunger 33 upon a pivoted contact arm or lever 34 which controls the circuit of the magnet 15. In this form, as in the form shown in Fig. 1, when the speed falls below the predetermined maximum, the circuit of the magnet 15 is automatically closed, thereby closing the valve 14$^a$ and permitting fluid to exhaust from the cylinder 11 through the exhaust opening 11ª and cuts off the supply from pipe 14. The exhaust opening 11ª is controlled by a second valve 14ᵇ on the same stem as the valve 14ª and actuated simultaneously therewith. The spring 13 then returns the arm 8 to its normal inoperative position.

Fig. 3 illustrates diagrammatically another way of controlling the operation of the trip arm 8. This arrangement differs from those shown in Figs. 1 and 2, in that the trip arm 8 is always in position to engage with the track trip 3, but means are provided whereby such engagement is ineffective to operate the release valve 16 except the speed of the train is in excess of the predetermined limit. This is effected by means of a relay 35 having the two fingers 36 and 37 attached to its armature. The finger 36 normally forms part of a circuit which includes the contact devices or circuit controllers 38 mounted on the shaft 10 of the arm 8 and similar to those shown in Figs. 6 and 7, and which circuit also includes the movable contact member 39 of a speed control device 40 which is similar to the device 34 shown in Fig. 2. The finger 37 normally closes the circuit of the magnet 18. The contact of the arm 8 with the track trip 3 will be ineffective to open the circuit of the magnet 18, unless the speed of the train is sufficiently high to cause the opening of the circuit by the movable contact member 39. That is to say, in order to deenergize the magnet 18 and permit fluid to escape from the valve 16, it is necessary that the circuit be opened not only at the contacts 38, but also by the contact-carrying member 39, since so long as the circuit is closed at either end of these two points, the relay magnet 35 remains energized and holds the circuit of the magnet 18 closed. When, however, the circuit is broken at both these points, the magnet 35 is deënergized causing both fingers 36 and 37 to fall to open positions. Until the speed of the train has been reduced to such an extent as to again close the circuit at 39, the magnet 18 cannot be reënergized.

Fig. 5 shows another method of controlling the operation of the escape valve which effects the service application of the brakes by the conjoint action of a speed-control device and a track trip. In this figure, 41 designates an ordinary ball governor which is driven in any suitable manner from one of the axles or other apparatus of the engine or vehicle. The vertically-movable member 42 of this governor engages one arm of a latch lever 43, and when the speed exceeds a certain limit, moves the other arm of said lever into latching engagement with the arm 44 of a bell crank lever to which the stem 45 of an exhaust valve 46 is connected, thereby holding said valve in open position. The other arm 44ª of the bell crank lever is engaged by the heel portion 47 of a pivoted trip arm 48 arranged for contact with the track trip arm 3.

The operation of this form of the invention is as follows: The arm 48 is always in position to engage the trip 3, but unless the speed of the train is in excess of the limit to which the ball governor is set, it will have but a momentary action on the valve 46 which will be immediately closed by the spring 49. If, however, the speed is above the limit, the latch lever 43 will catch the arm 44 of the bell crank when the latter is operated by the trip arm 48, and will thus hold the valve 46 in open position until the speed has been reduced sufficiently to release the latch arm.

As above stated, when the track trip 3 is used in connection with home and distant signals, its position is controlled by the position of the signals. Thus, if the home signal is at danger, the arm 3 should be in position to engage the trip arm 2 and bring the train to a full stop. If, however, the distant signal is at cautionary position, the arm 3 should be held in proper position to be engaged by the trip arm 8 to effect a service application of the brakes; while if both signals are at safety position, the arm 3 should be held in such position as to be entirely without effect on either of the trip arms 2 and 8. We therefore preferably arrange the trip arms 2 and 8 upon the engine or other vehicle at different distances from the center of the track, and so connect the arm 3 with the signal mechanism that it will be shifted laterally into the plane of either the one or the other of these arms, or will be rotated to a position below the lower ends of these arms, so as not to contact therewith. Mechanism for this purpose is shown in Figs. 9, 10 and 11. In these figures 50 designates the usual signal pole or post, which carries the home and distant signals. 51 designates the usual electro-pneumatic mechanism for operating these signals through the lever arms 52 and the vertical up and down rods 53 and 54 which extend upwardly through the signal post, and are connected to the semaphore arms. The rod 53 is connected to the distant signal arm, while the rod 54 is connected to the home signal arm. 55 designates a link which is connected at one end to an arm of the lever 52 of the home signal movement, and at its other end to one arm of a bell crank lever 56 placed adjacent to the track-way and to the other arm of which is connected a rod 57 to which the arm 3 is attached. The rod 57 is formed in two sections which are connected by a rotary joint 58 whereby the section 57ª will not only move endwise with the section 57, but may rotate independently thereof. 59 is a link which is connected at one end with the distant signal movement, and at its opposite end to an arm 60 of a rock shaft 61 journaled in bearings 62 and having an arm 63 to which is connected a link 64. The other end of this link extends into a casting 65 where it is connected to a counter-weight 66 which is attached to a shaft section 67, which has a square portion fitting within a coupling 68 by means of which it is connected to the end of the shaft section 57ª, sufficient clearance being provided within the coupling between the ends of the shaft sections 57ª and 67 to permit of endwise movement of the section 57ª, due to the travel of bell crank 56.

As the home signal is moved from one of its positions to the other, the trip arm 3 through the connections described is moved towards or away from the adjacent track rail, being in position to engage the trip arm 2 when the home signal is at danger position, and in position to engage the trip arm 8 when the home signal is clear, and the distant signal is at caution. When, however, the distant signal moves to clear position, the link 59 operates the rock shaft 61, and thereby the rod or link 64 rotates the shaft section 67 and thereby the shaft section 57ª to rock the arm 3 to a position below the plane of the head of the track rails, where it will be entirely clear of both trip arms. Instead of effecting these movements of the arm 3 by mechanical connections, said arm may be shifted to its different positions by fluid pressure means, as shown in Figs. 12 to 15 inclusive. In this case, the shaft sections 57 and 57ª are moved endwise by means of a piston 69 in a pneumatic cylinder 70 which is connected with a suitable source of fluid supply by a pipe 71 through a valved port 72, (Fig. 15). The valve 72 is controlled by an electromagnet 73 whose circuit 74 is in turn controlled by a circuit controller connected to the home signal arm 75, as illustrated diagrammatically in Fig. 15. When this arm is moved to danger position, the circuit 74 is broken, and the exhaust port 72ª is opened to release fluid from the cylinder 70, thereby causing the shaft sections 57, 57ª to shift endwise so as to bring the trip arm 3 into the position shown in full lines in Fig. 13 by means of spring 76. When the signal arm 75 moves to clear position, the magnet 73 is again energized, thereby opening the valve 72 and allowing fluid from the main supply to enter the cylinder 70. The piston 69 then moves the stop arm 3 to the position shown by dotted lines in Fig. 13. The shaft section 57ª is rotated to move the arm 3 out of operative position when the distant signal is at clear position, in the same manner as shown in Figs. 9, 10 and 11, except that the rod 64 instead of being actuated by mechanical connection with the signal movement is actuated by a piston 77 in a fluid pressure cylinder 78 (see Fig. 14). This cylinder is supplied with fluid by a pipe 79 whose supply is controlled in any suitable manner by or in connection with the movement of the distant signal. The counterweight 66 effects the return movement of the arm 3.

The advantages of our invention will be readily appreciated by those skilled in the art.

Our invention provides simple, positive and effective means whereby a train may be brought to a full stop or its speed reduced to any desired limit, wholly automatically, at any desired point or points either in connection with or independently of the signal mechanism. When used in connection with the signal mechanism of a railroad, it provides means which make it impossible for an engineer to run by a home signal set at danger, and compels the reduction of the speed in passing a distant signal at caution. If, however, the track and signals are clear in one case, and if the speed of the train is already at or below the limit in the other case, the mechanism remains idle and inoperative.

It will be understood that the detail construction and arrangement of the various parts herein shown and described are illustrative only of our invention, and that such portions may be changed in various ways, without affecting the essential features of our invention, since

What we claim is:—

1. In train control apparatus, valve mechanism for bringing the train to a full stop, a trip device for actuating the same, other valve mechanism for effecting a service application of the brakes, a trip device for operating the last named valve mechanism, and means whereby such operation is dependent upon the speed of the train; substantially as described.

2. In train control apparatus, valve mechanism for effecting a service application of the train brakes, a trip device for operating the valve mechanism, a speed actuated device carried by the train, and means controlled by said speed-actuated device whereby the operation of the trip device is dependent upon the speed of the train; substantially as described.

3. In train control apparatus, valve means for effecting a service application of the brakes, a trip device for operating the valve mechanism, and means controlled by the speed of the train for rendering said trip device inoperative except under predetermined conditions; substantially as described.

4. In train control apparatus, two trip actuated valve mechanisms carried by the train, one of said mechanisms being arranged to bring the train to a full stop, and the other to effect a predetermined reduction in its speed, a track trip, and means for shifting the track trip into position to operate either one of said mechanisms; substantially as described.

5. In train control apparatus, home and distant signals, a movable track trip, and operating connections between said trip and the home and distant signals: substantially as described.

6. In train control apparatus, home and distant signals, a track trip, connections between said trip and the home signal for moving said trip from one operative position to another, and connections between said trip and the distant signal for moving the trip into and out of operative position; substantially as described.

7. In train control apparatus, home and distant signals, actuating means therefor, a pivoted and laterally movable track trip, connections between said trip and the home signal for changing the position of said trip with reference to the center of the track, and connections between said trip and the distant signal for moving said trip on its pivot into and out of operative position; substantially as described.

8. In train control apparatus, a trip device, a brake controlling valve, electromagnetic means for operating said valve, and a speed governor, the said electromagnetic means being controlled in part by the trip and in part by the speed governor; substantially as described.

9. In train control apparatus, a trip arm, a brake controlling valve, a magnet for actuating said valve, a speed governor driven by the train, and switches actuated respectively by the trip and by the speed governor and controlling the circuit of the magnet; substantially as described.

10. In train control apparatus, a trip actuated valve mechanism adapted to bring the train to a full stop, means controlled by a home signal for effecting the operation of said valve mechanism, other valve mechanism arranged to effect a service application of the brakes, and means for operating the last named valve mechanism controlled in part by a distant signal and in part by the speed of the train; substantially as described.

11. In apparatus for train control, means on the train for effecting either a full or a service application of the brakes, track-operated trip devices for actuating said means, and coacting movable trip devices adjacent to the track having actuating mechanism which is inter-related to block-signal mechanism and means controlled by the speed of the train for rendering the means for effecting a service application of the brakes inoperative when the speed of the train is below a predetermined limit, substantially as described.

12. In apparatus for train control, means on the train for effecting either a full or a service application of the brakes, trip-devices carried by the train for actuating said means, means controlled by the speed of the train for controlling the operation of the trip device for actuating the means for effecting a service application of the brakes, coacting movable trip devices adjacent to the track, home and distant signals, actuating means therefor, and connections between the track trips and the signal-actuating means whereby the signals and track trips are set in certain corresponding positions and the brake applying devices on the train will be operated in accordance with the information given by the signals except as modified by the action of the means controlled by the speed of the train, substantially as described.

13. In apparatus for train control, means on the train for effecting a service application of the brakes, a trip device for actuating the same, a speed controlled device for controlling the action of the trip device, coöperating track trips, distant signals, and connecting actuating mechanism for the distant signals and track trips whereby when the signal is at caution, the track trip will be in position to engage the trip on the train, substantially as described.

In testimony whereof we have hereunto set our hands.

JENS G. SCHREUDER.
VIBE K. SPICER.

Witnesses as to Jens G. Schreuder:
  JAS. JOHNSON,
  C. C. WHITE.

Witnesses as to Vibe K. Spicer:
  E. T. BARNES,
  W. M. VANDERSLUIS.